United States Patent [19]
DiRisio

[11] Patent Number: 5,331,362
[45] Date of Patent: Jul. 19, 1994

[54] PHOTOGRAPHIC CAMERA WITH FLASH UNIT CAPABLE OF CHANGING ILLUMINATION ANGLE AND SEPARATION FROM TAKING LENS

[75] Inventor: Anthony DiRisio, Rochester, N.Y.

[73] Assignee: Eastman Kodak Company, Rochester, N.Y.

[21] Appl. No.: 75,967

[22] Filed: Jun. 11, 1993

[51] Int. Cl.$^5$ ............................................. G03B 15/03
[52] U.S. Cl. ............................ 354/149.1; 354/149.11; 354/126
[58] Field of Search ................. 354/149.1, 149.11, 126

[56] References Cited

U.S. PATENT DOCUMENTS

| | | | |
|---|---|---|---|
| 3,882,514 | 5/1975 | Graham | 354/149.1 |
| 4,423,940 | 1/1984 | Kashihara et al. | 354/149.1 |
| 4,462,666 | 7/1984 | Orban | 354/126 |
| 4,515,453 | 5/1985 | Wakabayashi et al. | 354/149.1 |
| 4,609,269 | 9/1986 | Kamata | 354/149.11 |
| 4,847,647 | 7/1989 | Ueda | 354/149.1 |
| 4,970,539 | 11/1990 | Sassagaki et al. | 354/149.1 |
| 4,978,989 | 12/1990 | Nakano et al. | 354/413 |
| 4,982,210 | 1/1991 | Shimada et al. | 354/149.1 |
| 4,983,998 | 1/1991 | Hirohata et al. | 354/149.1 |
| 5,055,866 | 10/1991 | Takebayashi | 354/149.1 |
| 5,132,718 | 7/1992 | Fujino et al. | 354/149.1 |

Primary Examiner—Monroe H. Hayes
Attorney, Agent, or Firm—Roger A. Fields

[57] ABSTRACT

A photographic camera comprises a camera body, and an electronic flash unit having a flash lens and light-emitting means capable of being separated to change the illumination angle of the flash unit. According to the invention, the flash unit is supported to permit the flash unit to be increasingly extended from the camera body, and regulating means connects the camera body with one of the flash lens and the light-emitting means for continuously separating the flash lens and the light-emitting means to vary the illumination angle of the flash unit as the flash unit is increasingly extended from the camera body.

4 Claims, 4 Drawing Sheets

PHOTOGRAPHIC CAMERA WITH FLASH UNIT CAPABLE OF CHANGING ILLUMINATION ANGLE AND SEPARATION FROM TAKING LENS

CROSS-REFERENCE TO A RELATED APPLICATION

Reference is made to commonly assigned copending application Ser. No. 075716 entitled PHOTOGRAPHIC CAMERA WITH FLASH UNIT CAPABLE OF CHANGING ILLUMINATION AND AIMING ANGLES and filed Jun. 11, 1993 in the name of Anthony DiRisio.

BACKGROUND OF THE INVENTION

1. Field of the Invention

The invention relates generally to the field of photography, and in particular to a photographic camera having an electronic flash unit capable of changing its extension from the camera body and its illumination angle in accordance with a change in the focal length of the taking lens.

2. Description of the Prior Art

A current trend in most camera design is to incorporate an electronic flash unit in the camera body and yet make the camera body relatively small in order to improve its ease of storage, portability and handling. As a consequence of making the camera body small, however, the separation between the built-in flash unit and the taking lens is reduced, which possibly creates an undesirable effect commonly known as "red-eye". When a flash unit is used with color print film to take pictures, red-eye is typified by the pupils in the eyes of a person being photographed coming out red-tinted on a color print made from the negative. This phenomenon is attributable to the incidence into the taking lens of the red light reflected from the retinas in the person's eyes illuminated by the flash light.

As is known, red-eye may be substantially prevented by increasing the separation between the flash unit and the taking lens. For example, U.S. Pat. No. 4,978,989, issued Dec. 18, 1990, suggests popping up the flash unit from a lower position relative to the camera body to a higher position relative to the camera body in accordance with an increase in the distance between a person to be photographed and the taking lens. Presumably, then, the light emitted from the flash unit will reach the eyes of a person being photographed at too great an angle to be reflected by his or her retinas into the taking lens.

Alternatively, red-eye may be substantially prevented by changing the separation between the flash lens and the light-emitting means, i.e. the flash tube and/or the flash reflector, of the flash unit to change the illumination angle of the flash unit in response to a change in the focal length of the taking lens. For example, U.S. Pat. No. 4,847,647, issued Jul. 11, 1989, suggests first flipping up the flash unit from an inoperative storage position folded against the camera body to an operative erect position elevated above the camera body and then increasing the separation between the flash lens and the light-emitting means of the flash unit to decrease the illumination angle of the flash unit as the focal length of a zoom lens is changed from a shorter one, e.g. 35 mm, to a longer one, e.g. 70 mm.

PROBLEM TO BE SOLVED BY THE INVENTION

Known prior art approaches for substantially preventing red-eye, as disclosed in U.S. Pat. Nos. 4,978,989 and No. 4,847,647, leave room for improvement.

THE CROSS-REFERENCED APPLICATION

The cross-referenced application discloses a photographic camera comprising a electronic flash unit capable of being swung about a pivot axis a limited amount to assume an aiming angle with respect to a subject to be photographed and having a flash lens and light-emitting means capable of undergoing a change in separation to change the illumination angle of the flash unit. According to the invention, regulating means is connected with the flash unit, including one of the flash lens and the light-emitting means, for changing the limited amount the flash unit can be swung about the pivot axis to vary the aiming angle of the flash unit in relation to a change in separation of the flash lens and the light-emitting means to change the illumination angle of the flash unit.

SUMMARY OF THE INVENTION

According to the invention, a photographic camera comprising a camera body, and an electronic flash unit having a flash lens and light-emitting means capable of being separated to change the illumination angle of the flash unit, is characterized in that:

the flash unit is supported to permit the flash unit to be increasingly extended from the camera body; and regulating means connects the camera body with one of the flash lens and the light-emitting means for continuously separating the flash lens and the light-emitting means to vary the illumination angle of the flash unit as the flash unit is increasingly extended from the camera body.

This combination of features has been found to effectively prevent red-eye.

DETAILED DESCRIPTION OF THE PREFERRED EMBODIMENT

The invention is disclosed as being embodied in a 35 mm still-picture camera with a zoom lens and an electronic flash unit. Because such a 35 mm camera is well known, this description is directed in particular to camera elements forming part of or cooperating directly with the preferred embodiment. It is to be understood, however, that camera elements not specifically shown or described may take various forms known to a person of ordinary skill in the art.

Figure 1:
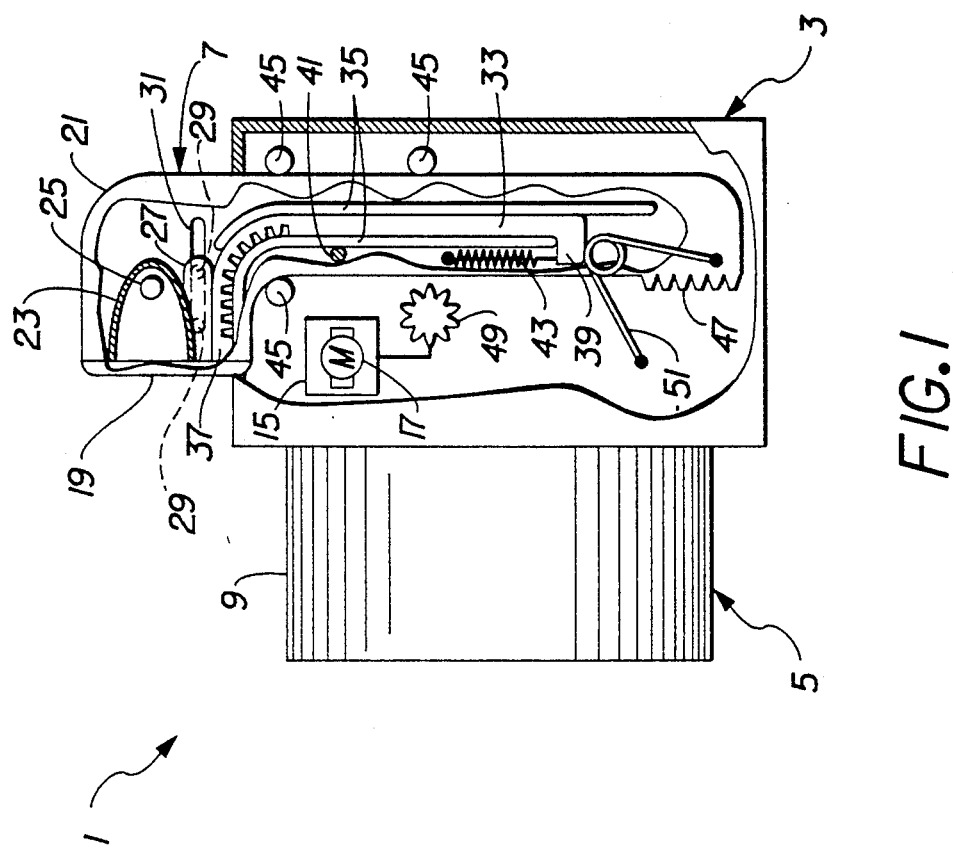
FIG. 1 is a schematic side elevation view of a photographic camera with a flash unit and a zoom lens according to a preferred embodiment of the invention, showing the photographic camera in an "off" mode.

Referring now to the drawings, FIG. 1 shows a 35 mm still-picture camera 1 comprising a camera body 3, a zoom taking lens 5, and an electronic flash unit 7.

Figure 2:
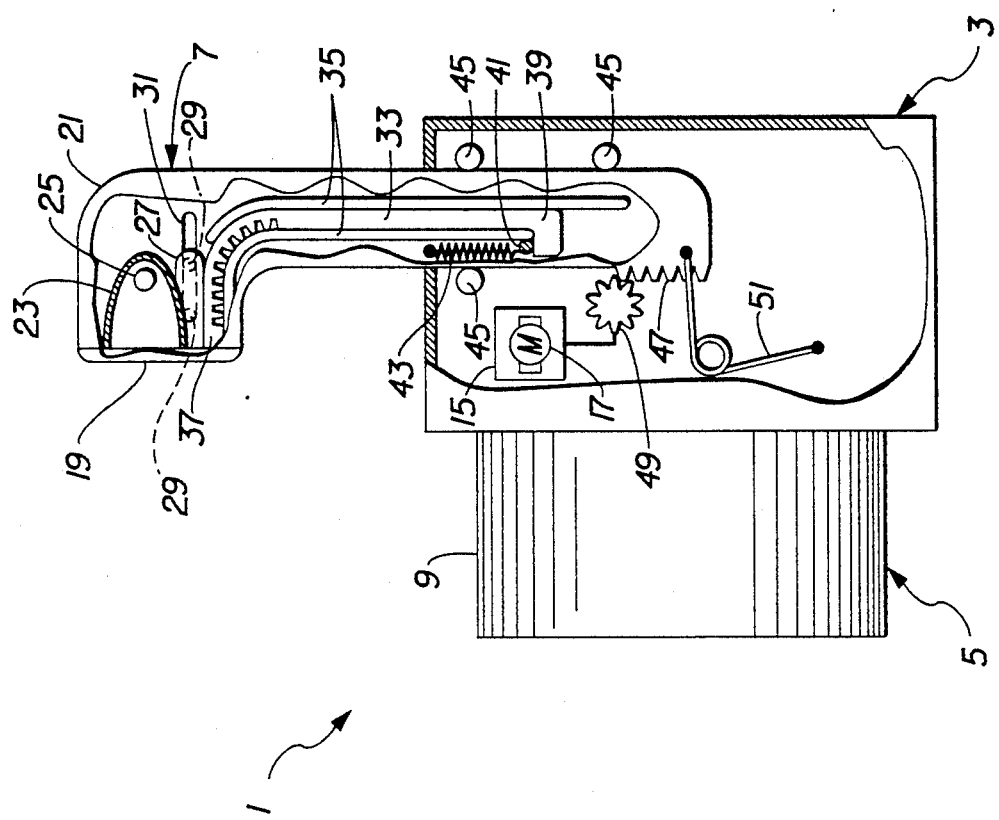
FIG. 2 is a view similar to FIG. 1, showing the photographic camera in an "on" mode with the zoom lens at a wide angle position (as in FIG. 1) in which its focal length is shortest and with the flash unit extended to a first elevated position in which its illumination angle is widest.
Figure 3:
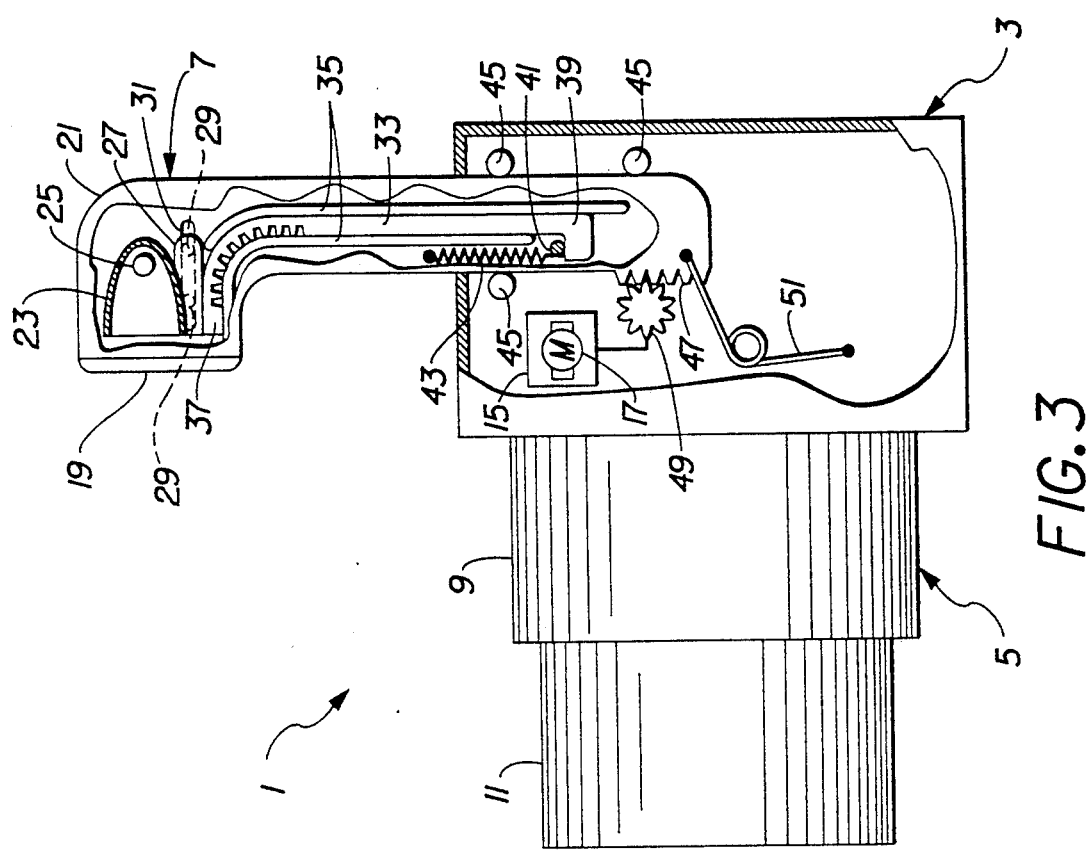
FIG. 3 is a view similar to FIG. 1, showing the photographic camera in the "on" mode with the zoom lens deployed to a normal position in which its focal length is mid-range and with the flash unit extended to a second elevated position in which its illumination angle is mid-size.
Figure 4:
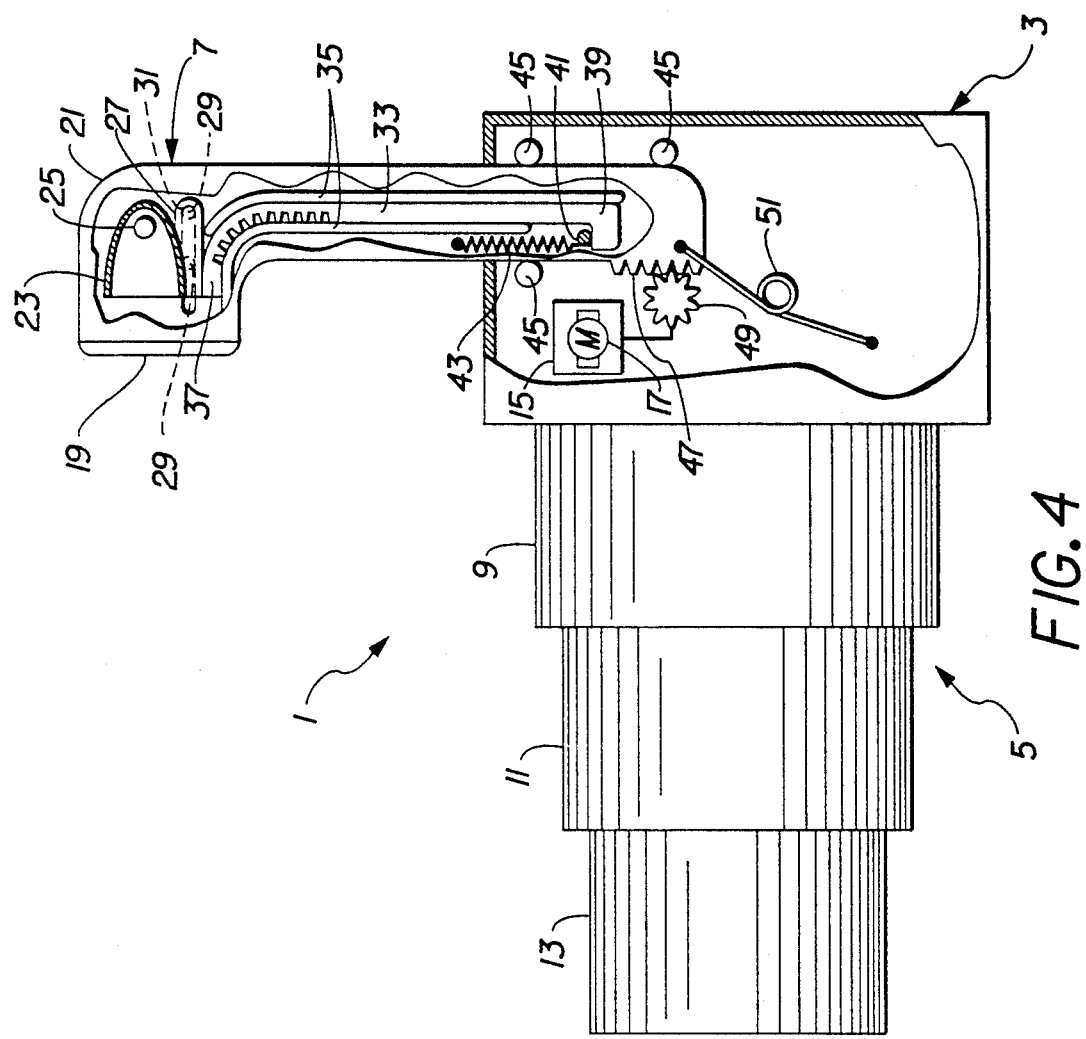
FIG. 4 is a view similar to FIG. 1, showing the photographic camera in the "on" mode with the zoom lens deployed to a telephoto setting in which its focal length is longest and with the flash unit extended to a third elevated position in which its illumination angle is narrowest.

The zoom lens 5 is a known type variable focal length taking lens which can be continuously adjusted to make its focal length increasingly longer or shorter by the individual outward and inward telescoping movement of its two lens groups 9 and 11 relative to its lens group 13. FIG. 2 (like FIG. 1) shows the zoom lens 5 at a wide angle position in which its focal length is shortest. FIG. 3 shows the zoom lens 5 deployed to a normal position in which its focal length is mid-range, e.g. 50 mm. FIG. 4 shows the zoom lens 5 deployed to a telephoto position in which its focal length is longest. Preferably, the two lens groups 9 and 11 are moved in opposite directions relative to the lens group 13 by a conventional lens drive mechanism 15 including a motor 17. An example of one lens drive mechanism is disclosed in U.S. Pat. No. 4,847,647, issued Jul. 11, 1989.

The flash unit 7 has a conventional flash lens 19 secured to a flash housing 21 and conventional light-emitting means depicted as a coupled flash reflector 23 and flash tube 25 each being located behind the flash lens. The flash reflector 23 with the flash tube 25 is mounted on a carriage 27 having several projections 29 which are held captive in an interior channel 31 formed along the inside of the flash housing 21 to support the carriage for continuous movement within the flash housing towards and away from the flash lens 19 to separate the flash reflector with the flash tube from the flash lens as shown in different amounts in FIGS. 3 and 4 and to return the flash reflector towards the flash lens until the flash reflector is located against the flash lens as shown in FIGS. 1 and 2. Separating the flash reflector 23 with the flash tube 25 from the flash lens 19 increases the flash illumination angle as disclosed in U.S. Pat. No. 4,847,647. FIG. 2 shows the flash reflector 23 with the flash tube 25 closest to the flash lens 19, in which instance the flash illumination angle is widest or greatest. FIG. 4 shows the flash reflector 23 with the flash tube 25 farthest from the flash lens 19, in which instance the flash illumination angle is narrowest or smallest. FIG. 3 shows the flash reflector 23 with the flash tube 25 part way from the flash lens 19, in which instance the flash illumination angle is mid-size.

A fixed length flexible web 33 is located between a pair of parallel guide rails 35 formed along the inside of the flash housing 21 as shown in FIG. 1. The fixed length web 33 has one end portion 37 secured to the carriage 27 and another end portion 39 shaped to be engaged by a stop 41 located on the inside of the camera body 3 as shown in FIGS. 2-4 but not in FIG. 1. A helical tension spring 43 is secured to the inside of the flash housing 21 and the end portion 39 of the fixed length web 33 to hold that end portion engaged by the stop 41 as shown in FIGS. 2-4. The flash unit 7 is supported by conventional means such as several rollers 45 rotatable mounted on the inside of the camera body 3 to permit the flash unit to be increasingly extended out of and retracted into an elongate nest, not shown, in the camera body. A rack 47 is formed along the outside of the flash housing 21 to be engaged by a pinion 49 rotationally coupled to the lens drive mechanism 15 to continuously extend and retract the flash unit 7 as the focal length of the zoom lens 5 is continuously changed by outward and inward telescoping movement of the two lens groups 11 and 13 relative to the lens group 9. See FIGS. 3 and 4.

OPERATION

Beginning with FIG. 1, the flash unit 7 is raised from the camera body 3 to a first elevated position as shown in FIG. 2 to convert the camera electronics, not shown, from an "off" mode to an "on" mode, to engage the rack 47 with the pinion 49, and to engage the end portion 39 of the fixed length web 33 with the stop 41. The tension spring 43 causes the fixed length web 33 to be lifted with the flash housing 21. An overcenter spring secured to the inside of the camera body 3 and the inside of the flash housing 21 maintains the flash unit 7 raised from the camera body 3.

Moving from FIG. 2 to FIG. 3 and to FIG. 4, the flash unit 7 is continuously raised from the camera body 3 from the first elevated position to second and third elevated positions via the rack 47 and the pinion 49 as the focal length of the zoom lens 5 is continuously made longer in portion to outward telescoping movement of the two lens groups 11 and 13 relative to the lens group 9. Simultaneously, the fixed length web 33 continuously pulls the carriage 27 away from the flash lens 19 to continuously separate the flash reflector 23 with the flash tube 25 from the flash lens to continuously narrow the flash illumination angle.

Returning from FIG. 4 to FIG. 3 to FIG. 2, the flash unit 7 is continuously lowered towards the camera body 3 from the third elevated position to the second elevated position and to the first elevated positions via the rack 47 and the pinion 49 as the focal length of the zoom lens 5 is continuously made shorter in portion to inward telescoping movement of the two lens groups 11 and 13 relative to the lens group 9. Simultaneously, the fixed length web 33 continuously pushes the carriage 27 away towards the flash lens 19 to continuously move the flash reflector 23 with the flash tube 25 towards the flash lens to continuously widen the flash illumination angle.

The invention has been described with reference to a preferred embodiment. However, it will be appreciated that variations and modifications can be effected by a person of ordinary skill in the art without departing from the scope of the invention.

PARTS LIST FOR FIGS. 1-4

1. camera
3. camera body
5. lens
7. flash unit
9, 11, and 13. lens groups
15. lens drive mechanism
17. motor
19. flash lens
21. flash housing
23. flash reflector
25. flash tube
27. carriage
29. projections
31. channel
33. web
35. guide rails
25 37 and 39. web end portions 41. stop
43. spring
45. rollers
47. rack
49. pinion

I claim:

1. A photographic camera comprising a camera body, and an electronic flash unit having a flash lens and light-emitting means capable of being separated to change the illumination angle of said flash unit, is characterized in that:

said flash unit is supported to permit the flash unit to be increasingly extended from said camera body; and regulating means connects said camera body with one of said flash lens and said light-emitting means for continuously separating the flash lens and the light-emitting means to vary the illumination angle of said flash unit as the flash unit is increasingly extended from the camera body.

2. A photographic camera as recited in claim 1, wherein said regulating means includes a stop located on said camera body and fixed length means having respective end portions adapted to be engaged by said stop and secured to one of said flash lens and said light-emitting means for moving one of the flash lens and the light-emitting means away from the other to continuously separate them as said flash unit is increasingly extended from the camera body.

3. A photographic camera as recited in claim 2, wherein said flash means is supported to permit the flash means to be increasingly retracted towards said camera body, and said regulating means includes spring means secured to said flash unit and said fixed length means for holding the fixed length means against said stop to make the fixed length means move one of said flash lens and said light-emitting means towards the other to continuously decrease their separation as the flash unit is increasingly retracted towards the camera body.

4. A photographic camera comprising a camera body, a variable focal length taking lens capable of being continuously adjusted make its focal length longer, and an electronic flash unit having a flash lens and light-emitting means capable of being separated to change the illumination angle of said flash unit in response to the focal length of said taking lens being made longer, is characterized in that:

drive means connects said taking lens with said flash unit for increasingly extending the flash unit from said camera body as the focal length of the taking lens is made longer; and regulating means connects said camera body with one of said flash lens and said light-emitting means for continuously separating the flash lens and the light-emitting means to vary the illumination angle of said flash unit as the flash unit is increasingly extended from the camera body.

* * * * *